Jan. 2, 1923.

G. HARZKE.
AUTOMOBILE CLUTCH SPRING COMPRESSOR TOOL.
FILED MAR. 11, 1921.

1,440,992

Gus Harzke.
INVENTOR.

BY
F. C. Trooman & Co.,
his ATTORNEYS.

Patented Jan. 2, 1923.

1,440,992

UNITED STATES PATENT OFFICE.

GUS HARZKE, OF CARMINE, TEXAS.

AUTOMOBILE CLUTCH-SPRING COMPRESSOR TOOL.

Application filed March 11, 1921. Serial No. 451,540.

*To all whom it may concern:*

Be it known that I, Gus Harzke, a citizen of the United States, residing at Carmine, in the county of Fayette and State of Texas, have invented certain new and useful Improvements in Automobile Clutch-Spring Compressor Tools, of which the following is a specification, reference being had therein to the accompanying drawings.

This invention relates to an automobile clutch spring compressor tool, and has for its object the construction of a simple and efficient device, by means of which the clutch spring and clutch spring pin can be easily and quickly removed and replaced in an automobile, such as a Chevrolet car.

With this and other objects in view, my invention comprises certain novel combinations, constructions and arrangements of parts as will be hereinafter described, illustrated in the accompanying drawings, and more particularly pointed out in the appended claim:

Figure 1:
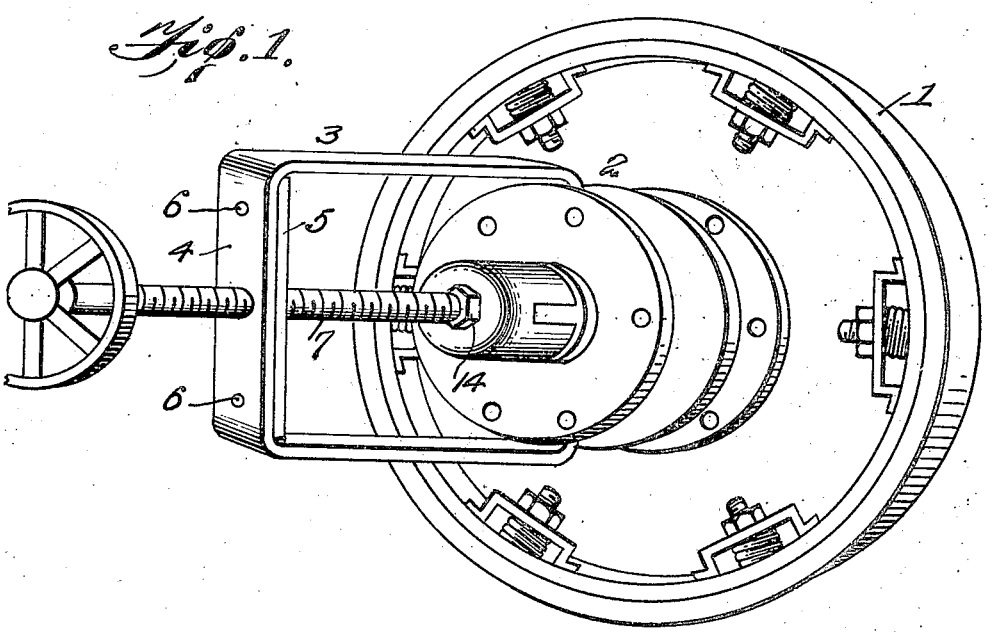
Figure 1 is a perspective view of a device constructed in accordance with the present invention and showing the position of the device applied to a Chevrolet clutch, assembled ready to compress the main spring.
Figure 2:
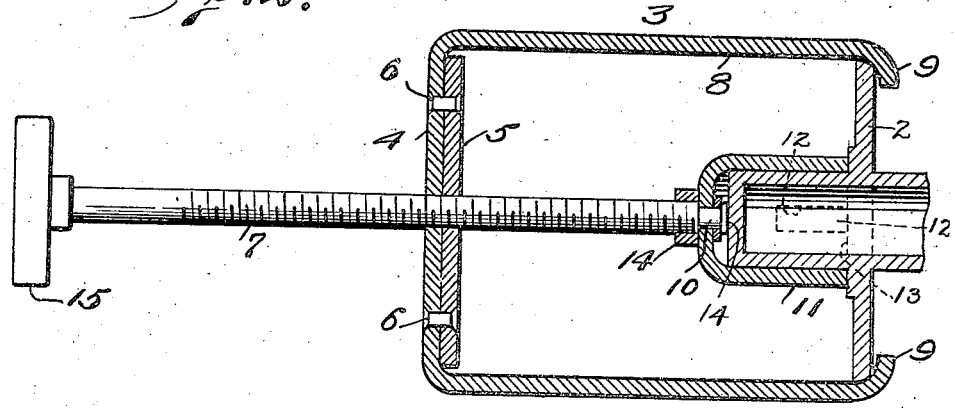
Figure 2 is partly a sectional view of my improved device.

Referring to the drawings by numerals, 1 designates the clutch cone, and 2 is the clutch hub and spring seat of any ordinary structure.

My device includes a substantially U-shaped frame 3, having an inner end 4, against which inner end, on its inner face, is a reinforcing plate 5, held in place by rivets 6, and through which end 4 and plate 5 is threaded the bolt 7. The parallel side portions 8 have their outer ends bent inwardly, as at 9, to engage the inner portion of the clutch hub 2, Fig. 1.

The inner end of the bolt 7 is reduced as at 10, and mounted on this reduced portion 10 is a cylinder swivel 11; the swivel 11 is slotted on opposite sides, as at 12; the outer end 13 of the swivel is open. A head 14 is formed upon the reduced portion 10, to retain the swivel 11 upon the bolt 7; a nut 14 is threaded upon the bolt 7, and this nut may be used for limiting the longitudinal adjustment of the bolt 7 upon the frame 3, by threading the nut 14 toward the inner end 4, if desired. A suitable grip 15 is formed upon the outer end of the bolt 7, whereby the operator can rotate the bolt easily upon the frame 3. My device or tool may be used to easily compress the center clutch spring of Chevrolet cars.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claim.

What I claim is:

As a new article of manufacture, a device of the class described, comprising a substantially U-shaped frame including parallel side portions and an inner end, the outer ends of the parallel side portions extending inwardly, a plate between the parallel side portions and secured against the inner end of the frame, a bolt threaded through the inner end of the frame and the plate and having its inner end reduced, a cylinder swivel on the reduced end of the bolt, a head formed on the reduced end securing the swivel upon the bolt, said swivel provided with slots upon opposite sides, and a nut threaded upon the bolt between the swivel and the plate, substantially as shown and described.

In testimony whereof I hereunto affix my signature.

GUS HARZKE.